United States Patent [19]

Machado et al.

[11] Patent Number: 5,300,530
[45] Date of Patent: Apr. 5, 1994

[54] PROCESS FOR MODIFYING THE GLYCOLYSIS REACTION PRODUCT OF POLYURETHANE SCRAP

[75] Inventors: Reinaldo M. Machado, Allentown; Brian E. Farrell, Fogelsville, both of Pa.

[73] Assignee: Air Products and Chemicals, Inc., Allentown, Pa.

[21] Appl. No.: 988,994

[22] Filed: Dec. 11, 1992

[51] Int. Cl.⁵ ............................................. C08G 18/14
[52] U.S. Cl. ..................................... 521/49; 521/49.5
[58] Field of Search ................................ 521/49, 49.5

[56] References Cited

U.S. PATENT DOCUMENTS

| | | | |
|---|---|---|---|
| 2,937,151 | 4/1960 | Ten Broeck | 260/2.3 |
| 3,708,440 | 1/1973 | Frulla et al. | 260/2.3 |
| 3,738,946 | 6/1973 | Frulla et al. | 260/2.3 |
| 3,983,087 | 7/1975 | Tucker et al. | 260/2.3 |
| 4,044,046 | 8/1977 | Kondo et al. | 260/471 C |
| 4,110,266 | 8/1978 | Sheratte | 260/2.3 |

*Primary Examiner*—Maurice J. Welsh
*Attorney, Agent, or Firm*—Michael Leach; James C. Simmons; William F. Marsh

[57] ABSTRACT

A process for converting polyurethane foam into reusable polyol composition which comprises glycolyzing the polyurethane foam to yield a glycolysis polyol product containing amines and reacting the glycolysis polyol product with an alkylene oxide in a mole ratio of <1 mole of alkylene oxide per mole of active amine hydrogen atom in the glycolysis polyol product.

15 Claims, No Drawings

PROCESS FOR MODIFYING THE GLYCOLYSIS REACTION PRODUCT OF POLYURETHANE SCRAP

TECHNICAL FIELD

The present invention relates to a process for converting scrap polyurethane into a reusable polyol composition.

BACKGROUND OF THE INVENTION

It is well known in the art that polyurethane scrap can be converted into a crude liquid polyol product via glycolysis. Representative of the glycolysis technology are U.S. Pat. Nos. 2,937,151; 3,708,440; 3,738,946; 3,983,087; 4,044,046 and 4,110,266. Glycolysis is essentially an equilibration of the urethane, urea and isocyanurate bonds in polyurethane material with glycols, such as propylene glycol diethylene glycol and dipropylene glycol, in the presence of catalysts, such as potassium acetate and tin carboxylates, to form a crude liquid polyol product. The process is typically conducted between 180° and 220° C. at atmospheric pressure requiring 2 to 6 hours to reach equilibrium. The glycolysis product contains active hydroxyls from the glycols and the liberated polyols as well as oligoineric amines and aromatic diamines such as toluene diamine (TDA) and methylene dianiline (MDA).

The crude glycolysis polyol is suitable as a partial replacement for virgin polyols which are used in the manufacture of polyurethane foams and other polyurethane products. However, the crude glycolysis polyol product has limitations when used as a replacement for virgin polyols. A crude glycolysis polyol product has a very high reactivity making it difficult to control when reacted at high levels with isocyanates to generate a polyurethane foam or a polyurethane article.

In addition, the crude glycolysis polyol product has high aromatic diamine content generally greater than 1%. Since aromatic diamines such as TDA and MDA are considered suspect carcinogens, this may limit the general use of crude glycolysis polyols.

Nevertheless, there are certain advantages that the crude glycolysis polyol imparts to polyurethane articles when compared to virgin polyols. For example, in certain foam systems the glycolysis polyol increases the compression strength of the foam while at the same time reducing the foam density. The crude glycolysis polyol acts as a crosslinker in the polyurethane article and thus offers a clear advantage when used in certain polyurethane systems.

The high reactivity, the high aromatic diamine content and the improved physical properties which the crude glycolysis polyol imparts to polyurethane articles are caused by the presence of high levels of aromatic primary amines fanned during the glycolysis process. Thus, there is a need to modify the crude glycolysis polyol to reduce the reactivity and the aromatic diamine content while maintaining the improved physical properties which the glycolysis polyol can impart to polyurethane articles.

U.S. Pat. No. 4,110,266 discloses a process for decomposing polyurethane using glycols, polyols, amines and/or ammonia and converting the decomposition mixture into a product substantially free of primary and secondary amines and containing an increased amount of polyols by reacting the decomposition mixture with an excess of alkylene oxide with respect to active hydrogen atoms of the amines for a period sufficient to convert the amines to polyols and forming a product mixture substantially free of primary and secondary amines. It is preferred that more than one and up to 3 moles of alkylene oxide is employed per mole of active hydrogen atom of the amines. U.S. Pat. No. 3,983,087 discloses a process for converting scrap flexible polyurethane foam into a homogeneous mixture of polyols by heating the scrap foam with not more than its own weight of an aliphatic diol which has at least one alkyl substituent in the alkylene chain. It is also suggested (Col 4/25-33) that the hydroxyl equivalent weight of the polyol mixture obtained by the process of the invention can be modified, i.e., increased, if desired, by reacting the recovered polyol with an alkylene oxide. However, none of the examples shows such addition of an alkylene oxide to the polyol mixture.

U.S. Pat. No. 3,738,946 discloses a process for converting scrap polyurethane into a reusable polyol by heating the scrap in the presence of a dihydroxy compound consisting of (i) from 100 to 90 wt. % of an aliphatic diol having a boiling point above about 180° C.; and (ii) from 0 to 10 wt. % of a dialkanol-amine having from 4 to 8 carbon atoms. When the scrap foams are derived from phosphorus containing polyols based on phosphoric acid, the polyol recovered in accordance with the process may contain significant amounts of acid-reacting material. It is recommended that the recovered polyol be treated to reduce the acid number by reacting the recovered polyol with sufficient alkylene oxide to react with all the acid hydroxyls in the recovered polyol. (Col 4/21-39). Example 7 shows the propoxylation of recovered polyol to reduce the acid number.

SUMMARY OF THE INVENTION

The present invention pertains to a process for converting polyurethane foam, such as scrap foam, foam trim and recyclable waste foam, into a reusable polyol composition by the glycolysis of the foam to yield a polyol product containing glycols, liberated polyols, oligoineric amines and aromatic diamines. This glycolysis polyol product is reacted with sufficient alkylene oxide to convert a substantial amount of the primary amines to secondary amines. For example, a sufficient amount of an alkylene oxide is used to convert substantially all the primary aromatic amines to secondary aromatic amines in the glycolysis polyol product prepared from a polyurethane foam made with aromatic polyisocyanate. Such amount will concomitantly be insufficient to convert a substantial amount of the secondary amines (those originally present in the polyol product plus those generated from the primary amines) to tertiary amines. It is preferred to accomplish this reaction with alkylene oxide by using less than one mole of alkylene oxide per mole of active amine hydrogen in the glycolysis polyol product, especially by using about one mole of alkylene oxide per mole of primary amine.

Such reaction of primary amines with the alkylene oxide reduces the primary aromatic diamines to less than 0.1% and reduces the reactivity of the glycolysis polyol product, yet the presence of secondary amines allows the polyol product to still act as an effective crosslinker in a polyurethane formulation to improve the compressive strength of the polyurethane article.

DETAILED DESCRIPTION OF THE INVENTION

The recycling of polyurethane foam into reusable polyols involves the glycolysis reactions well known in the art. Polyurethane foam is cut, ground or shredded into small particles <¼ inch (<0.64 cm). The ground foam is placed in a hopper attached to a screw-type solids feeder. An agitated, jacketed stainless steel reactor is filled with a glycol or mixture of glycols, such as propylene glycol, dipropylene glycol, diethylene glycol and the like, and a small amount of catalyst is added, for example 0.1 to 2% tertiary amine or tin carboxylate. The glycol mass is heated to between 180° and 220° C. The polyurethane foam is added semi-batch to the hot glycol at atmospheric pressure with a slight purge of nitrogen. As the foam contacts the glycol, it rapidly dissolves into the liquid reaction mass. Typical reactant mass ratios of foam to glycol range between 3:1 to 1:3, preferably between 1.2:1 to 0.8:1. The c(xnplete foam addition generally takes between 0.5 and 1 hour. The reactor is held at the reaction temperature from between 2 to 6 additional hours. Some off-gassing of the reaction mass can occur as carbon dioxide is evolved from byproduct reactions or steam is produced from moisture trapped in the foam. A condenser on the reactor is used to keep the glycol from evaporating with the nitrogen purge. When the digestion is completed, the recycled polyol is filtered.

Two primary reactions are responsible for the liquefaction and reformation of the urethane product, namely transurethanation and urea reformation. Urethane bonds linking the isocyanate and the polyol are attacked by the glycol and transurethanation occurs refanning the polyurethane bond with the glycol and liberating the original polyol. This basically creates a lower molecular weight version of the original urethane. The second reaction that occurs is the attack of urea bonds by the glycol to form a urethane with the glycol and an amine. In TDI or MDI based systems, the amines that are liberated are primarily oligomeric aromatic amines, i.e., one end of the original isocyanate is urethane linked and the other is transformed into an amine. However, some free diamine can be formed depending on the urethane product and process conditions. In addition to the primary reaction, side reactions such as pyrolysis and hydrolysis of the urethane and urea bonds can lead to the formation of free amines, carbon dioxide and other products.

The product composition of a recycled polyol is a very complex mixture of oligomers, polyols, glycols, glycol based urethanes, oligomeric amines and some free diamine. Each urethane product that is glycolyzed will yield a re-usable, or recyclable, polyol with a unique composition that depends on the type of glycol, the type and the formulation of the urethane product, i.e., rigid foam, flexible foam, packaging foam or elastomer.

All of the above with regard to the glycolysis of polyurethane material is well known in the art.

According to the present invention, the obtained polyol product from the glycolysis reaction is further reacted with an amount of alkylene oxide that is sufficient to substantially convert the primary amines in the polyol product while maintaining a high level of secondary amines. Suitable amounts of alkylene oxide would be about 0.2 to 0.8 moles alkylene oxide per mole of active amine hydrogen, preferably about 0.4 to 0.6 moles and, most desirably, about 0.5 moles of alkylene oxide per mole of active amine hydrogen in the glycolysis polyol product.

The reaction of the polyol product and alkylene oxide may be carried out under autogenous pressure, which can range from about 1 to 10 atm, usually between about 1 to 6 atm. Temperature of the reaction can range from about 80° to 180° C., preferably between about 120° and 140° C. The reaction time will usually range from about 2 to 12 hr.

During the reaction substantially all of the primary amine groups are converted into the desired secondary amine polyols although some of the original secondary amines and some of the newly formed secondary amines may be alkylated to tertiary amines.

Any suitable alkylene oxide or mixtures thereof can be employed for reaction with the primary amines of the glycolysis polyol product. The alkylene oxide employed can contain an alkylene group of from 2 to about 7 carbon atoms and such alkylene groups can be derived from aliphatic and cycloaliphatic chains and can carry substituents such as aryl groups. Examples of suitable alkylene oxides include ethylene oxide, butylene oxide, pentene oxide, hexylene oxide, styrene oxide, epichlorohydrin, trichlorobutylene oxide and the preferred propylene oxide.

Although the glycolysis polyol product is a liquid, solvents such as alcohols and other polyols and glycols may be added to facilitate the reaction with the alkylene oxide.

EXAMPLE 1

Polyurethane foam was obtained from commercially available scrap packaging foam. Scrap packaging foam (6.10 kg) manufactured by Sealed Air Corporation was comminuted and fed to a reactor containing 6.40 kg of dipropylene glycol and 0.128 kg of Dabcom T-12 catalyst. The reaction was maintained at atmospheric pressure between 190° and 210° C. until the reaction was completed, i.e. when the viscosity of the reaction mixture was stable. The final crude glycolysis polyol had an OH# of 545 mg KOH/gm, a primary aromatic amine content of 1.52 eq/kg including 0.27 eq/kg in the form of MDA, a tertiary ar(aromatic amine content of 0.07 eq/kg, and an acid number of 0.478 mg KOH/gm. Therefore, 95.4% of the total amine in this crude glycolysis polyol was in the form of potentially reactive primary amines.

EXAMPLE 2

The crude glycolysis polyol produced in Example 1 was charged to an agitated autoclave reactor equipped with both heating and cooling. The glycolysis polyol (4.204 kg; 6.39 eq) was heated to 100° C. and 0.424 kg (7.31 eq) of propylene oxide was pumped into the reactor over 15 minutes. The reactor was sealed and the reaction allowed to proceed under autogenous pressure at 100° C. until complete, i.e. the reactor pressure decreased to a constant pressure. The ratio of propylene oxide to active amine hydrogen in this example was 0.572 or 1.14 moles of propylene oxide per mole of primary aromatic amine. The final product had a combined primary plus secondary aromatic amine content of 0.81 eq/kg, a tertiary aromatic amine content of 0.57 eq/kg, an OH# of 486 mgKOH/gm and an acid number of 0.490 mgKOH/gm. Amine due to MDA was 0.006 eq/g. In this sample, 58.7% of the total amine was in the form of primary or secondary amine.

EXAMPLE 3

Following the teaching of U.S. Pat. No. 4,110,266 the crude glycolysis polyol produced in Example 1 was charged to an agitated autoclave reactor equipped with both heating and cooling. 1.000 kg of the glycolysis polyol was heated to 120° C. and 0.250 kg of propylene oxide was pumped into the reactor over 75 minutes. The reactor was sealed and the reaction was allowed to proceed under autogenous pressure at 120° C. until complete, i.e. the reactor pressure decreased to a constant pressure. The ratio of propylene oxide to active amine hydrogen in this example was 1.42 or 2.84 moles of propylene oxide per mole of primary aromatic amine. The final product had a tertiary aromatic amine content of 1.30 eq/kg, an OH# of 483.6 mgKOH/gm and an acid number of 0.18 mgKOH/gm. The combined aromatic primary plus secondary amine and the MDA content of this sample were both below quantifiable limits.

EXAMPLE 4

A low-density rigid polyurethane foam was made from commercially available materials to serve as a base case. The following components (parts by weight) were blended to yield a polyol mixture for the base case foams:

(1) 31.3 parts of Stepanpol PS2502A polyol, an aromatic polyester polyol with an hydroxyl number of 240-260 mg KOH/G.

(2) 31.3 parts of Voranol 3137 polyol, a polyether polyol with an hydroxyl number of 56 mg KOH/G.

(3) 15.7 parts of Voranol 240-490 polyol, a polyol composed of propoxylated glycerine and propoxylated sucrose, with an hydroxyl number of 490 mg KOH/G.

(4) 8.7 parts of M4050 polyol, a polyether quadrol with an equivalent weight of 87.5.

The mixture of components (1)-(4) above will be referred to as "Example 4 Polyol" in subsequent Examples. The following additives were blended with components (1)-(4) to complete the formulation of the polyol side, for this example.

(5) 2 parts of Dabco T amine catalyst.
(6) 1 parts of organosilicone surfactant.
(7) 10 parts of water.

The above polyol side (100.0 parts; 1.52 hydroxyl equivalents) was added to 130.0 parts PAPI 27 Polymeric MDI, which is a mixture of diphenylmethane diisocyanate (MDI) and polymethylene polyphenylene polyisocyanate with an isocyanate equivalent weight of 135 g/eq (resulting in 0.96 isocyanate equivalents in isocyanate side). The polyol and isocyanate sides were both at 20° C. when added together. The polyol/isocyanate solution was mixed for 5 seconds at a high rate of speed with a mechanical stirrer. The foam was allowed to rise freely until reaction was complete. Kinetic parameters measured during foam formation included string-gel time (SG), full-rise time (FROM), and tack-free (TF) time. The full-rise height of the foam was measured at the end of foam rise. Foams were cured at 20° C. for 24 hours, at which time foam height was remeasured to determine the extent of foam shrinkage. Foam density, compressive strength parallel to the direction of rise, and compressive strength perpendicular to the direction of rise were also determined after 24 hours. Compressive strength parallel to the direction of rise was measured in two planes. Plane 1 was located 280 mm from the base of the foam and Plane 2 was located 255 mm from the base of the foam. Results for the base case foam are tabulated in Table 1.

TABLE 1

| | |
|---|---|
| String-gel time (sec) | 24.2 |
| Full-rise time (sec) | 32.9 |
| Tack-free time (sec) | 49.0 |
| Full-rise height (mm) | 392.0 |
| Final height (mm) | 388.5 |
| Full-rise height/Final height | 0.991 |
| Density (lb/ft$^3$; g/cm$^3$) | 0.842; 0.0135 |
| Parallel compressive strength - Plane 1 (psi; MPa) | 3.13; 0.0216 |
| Parallel compressive strength - Plane 2 (psi; MPa) | 2.81; 0.0194 |
| Perpendicular compressive strength (psi; MPa) | 2.13; 0.0147 |

EXAMPLE 5

Polyurethane foam was made that incorporated the Example 2 propoxylated glycolysis polyol at a level of 10% of the polyol side. The polyol side for this example was composed of:

(1) 77 parts of "Example 4 Polyol"
(2) 10 parts of Example 2 propoxylated glycolysis polyol
(3) 2 parts of Dabco T catalyst
(4) 1 part of organosilicone surfactant
(5) 10 parts of water Foams were made and foam properties measured following the method outlined in Example 4.

EXAMPLE 6

Polyurethane foam was made that incorporated the Example 2 propoxylated glycolysis polyol at a level of 20% of the polyol side. The polyol side for this example was composed of:

(1) 67 parts of "Example 4 Polyol"
(2) 20 parts of Example 2 propoxylated glycolysis polyol
(3) 2 parts of Dabco T, an amine catalyst
(4) 1 part of organosilicone surfactant
(5) 10 parts of water Foams were made and foam properties measured following the method outlined in Example 4. Kinetic measurements and physical property results for Example 5 and Example 6 foams are tabulated in Table 2.

TABLE 2

| Foam Property | Example 5 | Example 6 | Base Case |
|---|---|---|---|
| String-gel time (sec) | 23.1 | 23.8 | 24.2 |
| Full-rise time (sec) | 32.3 | 34.1 | 32.9 |
| Tack-free time (sec) | 44.8 | 43.9 | 49.0 |
| Full-rise height (mm) | 395.3 | 406.1 | 392.0 |
| Final height (mm) | 389.6 | 381.5 | 388.5 |
| Full-rise height/ Final height | 0.986 | 0.939 | 0.991 |
| Density (lb/cu ft; g/cm$^3$) | 0.779; .0125 | 0.758; .0121 | 0.842; .0135 |
| Parallel compressive strength- Plane 1 (psi; MPa) | 3.17; .0219 | 3.12; .0215 | 3.13; .0216 |
| Parallel compressive strength- Plane 2 (psi; MPa) | 3.26; .0225 | 2.47; .0170 | 2.81; .0194 |
| Perpendicular compressive strength (psi; MPa) | 3.40; .0234 | 2.86; .0197 | 2.13; .0147 |

Incorporation of the propoxylated glycolysis polyol at a level of 10% of the polyol side (Example 5) resulted in a foam that was less dense and had higher compressive strengths than the base case foams, while maintaining the reactivity profile of the base case. An increase in the perpendicular compressive strength by 60% and a decrease of 7.5% in foam density were the most dramatic improvements observed for Example 5 foams. The improved physical properties of Example 5 resulted from the increased crosslinking activity of the propoxylated glycolysis polyol compared to the base case formulation. Secondary amines that are present in the propoxylated glycolysis polyol effectively displace water and polyol for reaction with isocyanate. In this manner, additional water is available for blowing the foam, resulting in decreased foam density. Incorporation of the multifunctional propoxylated glycolysis polyol in the foam matrix increases the crosslink density of the foam, resulting in the improved compressive strengths in Example 5 foams.

Example 6 foams also exhibited several advantages compared to base case foams, while matching the reactivity profile of the base case. The primary benefits were an increase in the perpendicular compressive strength by 34% and a 10% decrease in foam density. However, increasing the content of propoxylated glycolysis polyol from 10% in Example 5 to in Example 6 resulted in a decrease in compressive strengths from Example 5 to Example 6. The parallel compressive strength in Plane 2 for Example 6 decreased below the base case value. These observations indicate that foams made with increasingly higher levels of propoxylated glycolysis polyol in the polyol side may result in foams that are generally inferior in quality compared to the base case.

EXAMPLE 7

Polyurethane foam was made that incorporated the Example 3 propoxylated glycolysis polyol according to U.S. Pat. No. 4,110,266 at a level of 10% of the polyol side. The polyol side for this example was composed of:
(1) 77 parts of "Example 4 Polyol"
(2) 10 parts of Example 3 propoxylated glycolysis polyol
(3) 2 parts of Dabco T catalyst
(4) 1 part of organosilicone surfactant
(5) 10 parts of water Foams were made and foam properties measured following the method outlined in Example 4.

EXAMPLE 8

Polyurethane foam was made that incorporated the Example 3 propoxylated glycolysis polyol according to U.S. Pat. No. 4,110,266 at a level of 20% of the polyol side. The polyol side for this example was composed of:
(1) 67 parts of "Example 4 Polyol"
(2) 20 parts of Example 3 propoxylated glycolysis polyol
(3) 2 parts of Dabco T catalyst
(4) 1 part of organosilicone surfactant
(5) 10 parts of water Foams were made and foam properties measured following the method outlined in Example 4. Kinetic measurements and physical property results for Example 7 and Example 8 foams are tabulated in Table 3.

TABLE 3

| Foam Property | Example 7 | Example 8 | Base Case |
| --- | --- | --- | --- |
| String-gel time (sec) | 26.8 | 27.1 | 24.2 |
| Full-rise time (sec) | 37.8 | 37.5 | 32.9 |
| Tack-free time (sec) | 52.8 | 49.5 | 49.0 |
| Full-rise height (mm) | 388.1 | 393.6 | 392.0 |
| Final height (mm) | 380.9 | 389.0 | 388.5 |
| Full-rise height/Final height | 0.981 | 0.988 | 0.991 |
| Density (lb/cu ft; g/cm$^3$) | .808; .0129 | .856; .0137 | .842; .0135 |
| Parallel compressive strength - Phase 1 (psi; MPa) | 2.62; .0181 | 2.42; .0167 | 3.13; .0216 |
| Parallel compressive strength - Plane 2 (psi; MPa) | 2.55; .0176 | 1.70; .0117 | 2.81; .0194 |
| Perpendicular compressive strength (psi; MPa) | 2.21; .0152 | 2.49; .0172 | 2.13; .0147 |

Incorporation of the Example 3 propoxylated glycolysis polyol at a level of either 10% or 20% in the polyol side (Examples 7 and 8) resulted in foams with slower reactivity profiles than the base case. Additional catalyst would be required in the formulations of Examples 7 and 8 in order to match the reactivity profile of the base case.

Example 7 foams displayed at 4?,. decrease in density compared to the base case; however, this advantage was gained at the expense of decreased compressive strengths parallel to the direction of foam rise. As the level of incorporation of Example 3 propoxylated glycolysis polyol was increased to 20% (Example 8), foam density increased to 102% of the base case level and parallel compressive strengths decreased.

Foams made in Example 5 using 10% Example 2 propoxylated glycolysis polyol (present invention) are compared to foams made in Example 7 using 10% Example 3 propoxylated glycolysis polyol (prior art) in Table 4.

TABLE 4

| Foam Property | Example 5 | Example 7 |
| --- | --- | --- |
| String-gel time (sec) | 23.1 | 26.8 |
| Full-rise time (sec) | 32.3 | 37.8 |
| Tack-free time (sec) | 44.8 | 52.8 |
| Full-rise height (mm) | 395.3 | 388.1 |
| Final height (mm) | 389.6 | 380.9 |
| Full-rise height/Final height | 0.986 | 0.981 |
| Density (lb/cu ft; g/cm$^3$) | 0.779; 0.0125 | 0.808; 0.0129 |
| Parallel compressive strength - Plane 1 (psi; MPa) | 2.83; 0.0219 | 2.62; 0.0181 |
| Parallel compressive strength - Plane 2 (psi; MPa) | 3.26; 0.0225 | 2.55; 0.0176 |
| Perpendicular compressive strength (psi; MPa) | 3.40; 0.0234 | 2.21; 0.0152 |

The foams of Example 5, according to the present invention, exhibit several distinct advantages over foams made using material generated according to the prior art in Example 7. First, the foams of Example 5 display a faster reactivity profile than the foams of Example 7. Therefore, a formulation incorporating propoxylated glycolysis polyol from the present invention would require a reduced amount of catalyst to match a given reactivity profile than would a formulation incorporating an equal amount of propoxylated glycolysis polyol prepared according to the prior art. Second, a lower density foam is obtained following the procedures of the present invention when compared to the prior art. Lower density foams are desirable in a number of foam applications including foams used for packaging. The third advantage is that foam made according to the present invention has greater compressive strengths both parallel and perpendicular to the direction of risen than foams made using an equal amount of propoxylated glycolysis polyol from the prior art.

Foams made in Example 6 using 20% Example 2 propoxylated glycolysis polyol (present invention) are compared to foams made in Example 8 using 20% Example 3 propoxylated glycolysis polyol (prior art) in Table 5.

TABLE 5

| Foam Property | Example 6 | Example 8 |
|---|---|---|
| String-gel time (sec) | 23.8 | 27.1 |
| Full-rise time (sec) | 34.1 | 37.5 |
| Tack-free time (sec) | 43.9 | 49.5 |
| Full-rise height (mm) | 406.1 | 393.6 |
| Final height (mm) | 381.5 | 389.0 |
| Full-rise height/Final height | 0.939 | 0.988 |
| Density (lb/cu ft; g/cm$^3$) | 0.758; 0.0121 | 0.856; 0.0137 |
| Parallel compressive strength - Plane 1 (psi; MPa) | 3.12; 0.0215 | 2.42; 0.0167 |
| Parallel compressive strength - Plane 2 (psi; MPa) | 2.47; 0.0170 | 1.70; 0.0117 |
| Perpendicular compressive strength (psi; MPa) | 2.86; 0.0197 | 2.49; 0.0172 |

The three advantages discussed above for a foam formulation incorporating 10% propoxylated glycolysis polyol according to the present invention, as compared to a formulation incorporating an equal amount of propoxylated glycolysis polyol prepared according to the prior art, are also apparent at a 20% level of incorporation.

The advantages cited in Tables 4 and 5 above for propoxylated glycolysis polyol made according to the present invention are derived from the chemical nature of the propoxylated glycolysis polyol. The Example 2 propoxylated glycolysis polyol contains active amine hydrogen molecules whereas the process of the prior art removes essentially all active amine hydrogen functionality in Example 3 propoxylated glycolysis polyol. The active amine hydrogen molecules in the propoxylated glycolysis polyol from the present invention react with isocyanate to form the foam matrix, thereby displacing water from reacting and resulting in increased cross link density. The displaced water is converted to steam by the heat of reaction, leading to an increase in foam blowing and a decrease in foam density. The increased crosslink density is manifested as an increase in compressive strength.

EXAMPLE 9

Polyurethane foam was made that incorporated the Example 1 crude glycolysis polyol at a level of 10% of the polyol side. The polyol side for this example was composed of:

(1) 77 parts of "Example 4 Polyol"
(2) 10 parts of crude glycolysis polyol from Example 1
(3) 2 parts of Dabco T catalyst
(4) 1 part of organosilicone surfactant
(5) 10 parts of water Foams were made and foam properties measured following the method outlined in Example 4.

EXAMPLE 10

Polyurethane foam was made that incorporated the Example 1 crude glycolysis polyol at a level of 20% of the polyol side. The polyol side for this example was composed of:

(1) 67 parts of "Example 4 Polyol"
(2) 20 parts of crude glycolysis polyol from Example 1
(3) 2 parts of Dabco T catalyst
(4) 1 part of organosilicone surfactant
(5) 10 parts of water Foams were made and foam properties measured following the method outlined in Example 4. Kinetic measurements and physical property results for Example 9 and 10 foams are compared to similar measurements for base case foams in Table 6.

TABLE 6

| Foam Property | Example 9 | Example 10 | Base Case |
|---|---|---|---|
| String-gel time (sec) | 20.5 | 16.3 | 24.2 |
| Full-rise time (sec) | 30.7 | 25.2 | 32.9 |
| Tack-free time (sec) | 39.7 | 30.3 | 49.0 |
| Full-rise height (mm) | 404.8 | 398.2 | 392.0 |
| Final height (mm) | 395.1 | 395.7 | 388.5 |
| Full-rise height/Final height | 0.976 | 0.994 | 0.991 |
| Density (lb/cu ft; g/cm$^3$) | .782; .0125 | .768; .0123 | .842; .0135 |
| Parallel compressive strength - Plane 1 (psi; MPa) | 3.12; .0215 | 2.82; .0194 | 3.13; .0216 |
| Parallel compressive strength - Plane 2 (psi; MPa) | 2.97; .0205 | 3.01; .0207 | 2.81; .0194 |
| Perpendicular compressive strength (psi; MPa) | 2.43; .0167 | 2.86; .0197 | 2.13; .0147 |

The presence of primary and secondary amines in the Example 1 crude glycolysis polyol results in faster reactivity profiles for Example 9 and 10 foams than for base case foams. This increase in reaction rate may be advantageous in some systems. In order to match the reactivity profile of foams incorporating crude glycolysis polyol with base case foams, a reduced catalyst level could be employed in the crude glycolysis polyol formulations, resulting in a raw materials cost savings. The primary and secondary amines in the crude glycolysis polyol formulations of Example 9 and 10 effectively displace water from reacting with isocyanate. This displaced water is available for foam blowing, resulting in the decreased foam densities evident in Example 9 and 10 foams compared to the base case. The crosslinking activity of the primary ar(aromatic amines of the crude glycolysis polyol is evident in the increased perpendicular compressive strengths of Example 9 and 10 foams compared to the base case. Parallel compressive strengths are roughly equivalent to the base case foams.

STATEMENT OF INDUSTRIAL APPLICATION

The present invention provides a reusable polyol composition from the glycolysis of scrap polyurethane foam.

We claim:

1. In a process for converting polyurethane foam into a reusable polyol composition by the glycolysis of the polyurethane foam to yield a glycolysis polyol product containing primary and secondary amines, the improvement which comprises reacting the glycolysis polyol product with a sufficient amount of an alkylene oxide to convert substantially all the primary amines to secondary amines, which amount of alkylene oxide is insufficient to convert a substantial amount of secondary amines to tertiary amines.

2. The process of claim 1 in which about one mole of alkylene oxide are reacted per mole of primary amine in the glycolysis polyol product.

3. The process of claim 1 in which the alkylene oxide is ethylene oxide, propylene oxide, butylene oxide, pentene oxide, hexylene oxide, styrene oxide, epichlorohydrin or trichlorobutylene oxide.

4. The process of claim 1 in which the alkylene oxide is propylene oxide.

5. In a process for converting polyurethane foam into a reusable polyol composition by the glycolysis of the polyurethane foam to yield a glycolysis polyol product containing primary and secondary amines, the improvement which comprises reacting the glycolysis polyol product with less than one mole of an alkylene oxide per mole of active amine hydrogen atoms in the glycolysis polyol product.

6. The process of claim 5 in which 0.2 to 0.8 moles of alkylene oxide are reacted per mole of active amine hydrogen atoms in the glycolysis polyol product.

7. The process of claim 6 in which the alkylene oxide is ethylene oxide, propylene oxide, butylene oxide, pentene oxide, hexylene oxide, styrene oxide, epichlorohydrin or trichlorobutylene oxide.

8. The process of claim 7 in which 0.4 to 0.6 moles of alkylene oxide are reacted per mole of active amine hydrogen atoms in the glycolysis polyol product.

9. The process of claim 7 in which about 0.5 moles of alkylene oxide are reacted per mole of active amine hydrogen atoms in the glycolysis polyol product.

10. The process of claim 5 in which the alkylene oxide is propylene oxide.

11. The process of claim 6 in which the alkylene oxide is propylene oxide.

12. In a process for converting polyurethane foam into a reusable polyol composition by the glycolysis of the polyurethane foam to yield a glycolysis polyol product containing primary and secondary amines, the improvement which comprises reacting the glycolysis polyol product with a sufficient amount of propylene oxide to convert substantially all the primary amines to secondary amines while maintaining a level of secondary amine sufficient to act as an effective crosslinker in a polyurethane formulation.

13. The process of claim 12 in which the amount of propylene oxide is insufficient to convert a substantial amount of secondary amines to tertiary amines.

14. The process of claim 8 in which the alkylene oxide is propylene oxide.

15. The process of claim 8 in which the alkylene oxide is propylene oxide.

* * * * *